Jan. 19, 1965  F. W. FLOWERS  3,166,341
TANDEM RUNNING GEAR ASSEMBLY
Filed April 3, 1963  2 Sheets-Sheet 1
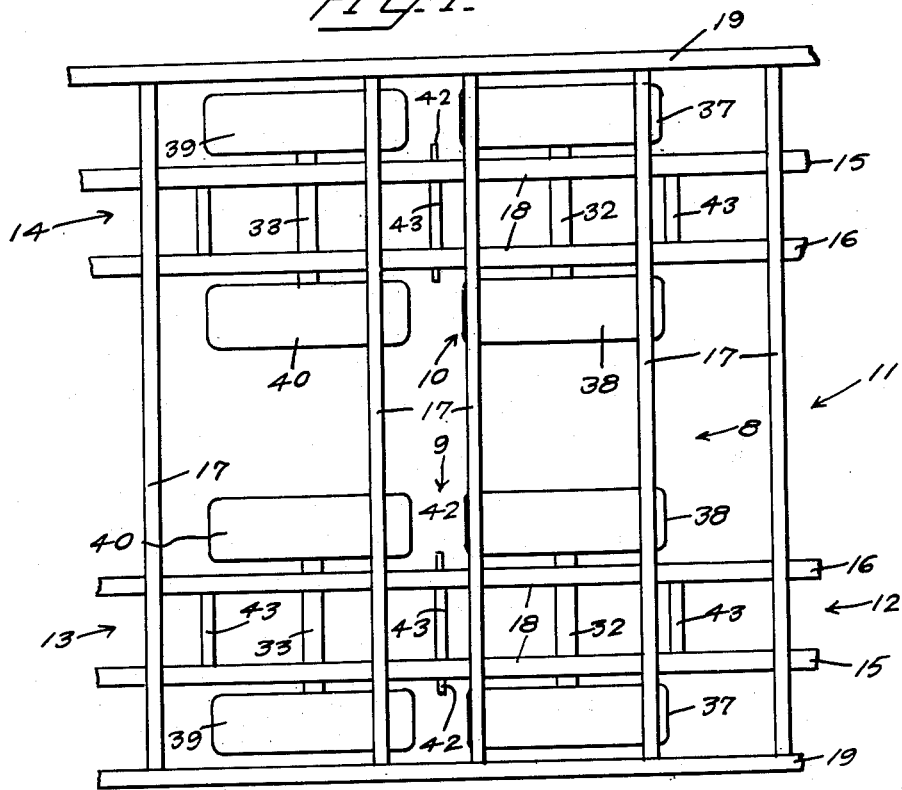
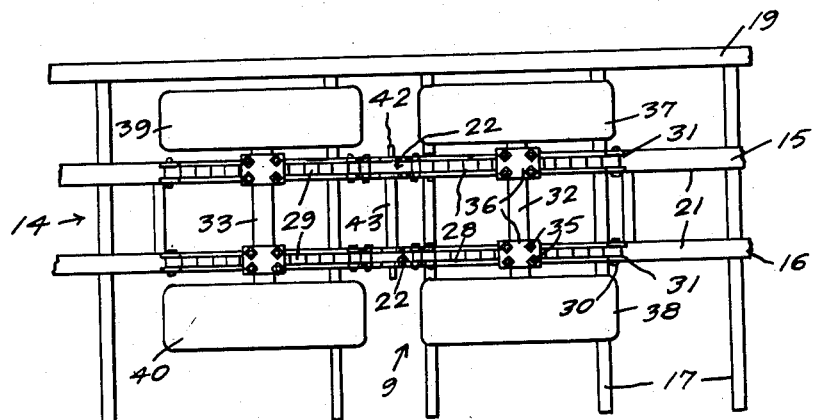
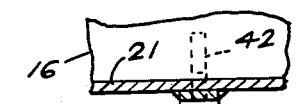
INVENTOR
F. W. FLOWERS
BY John H. Randolph
ATTORNEY

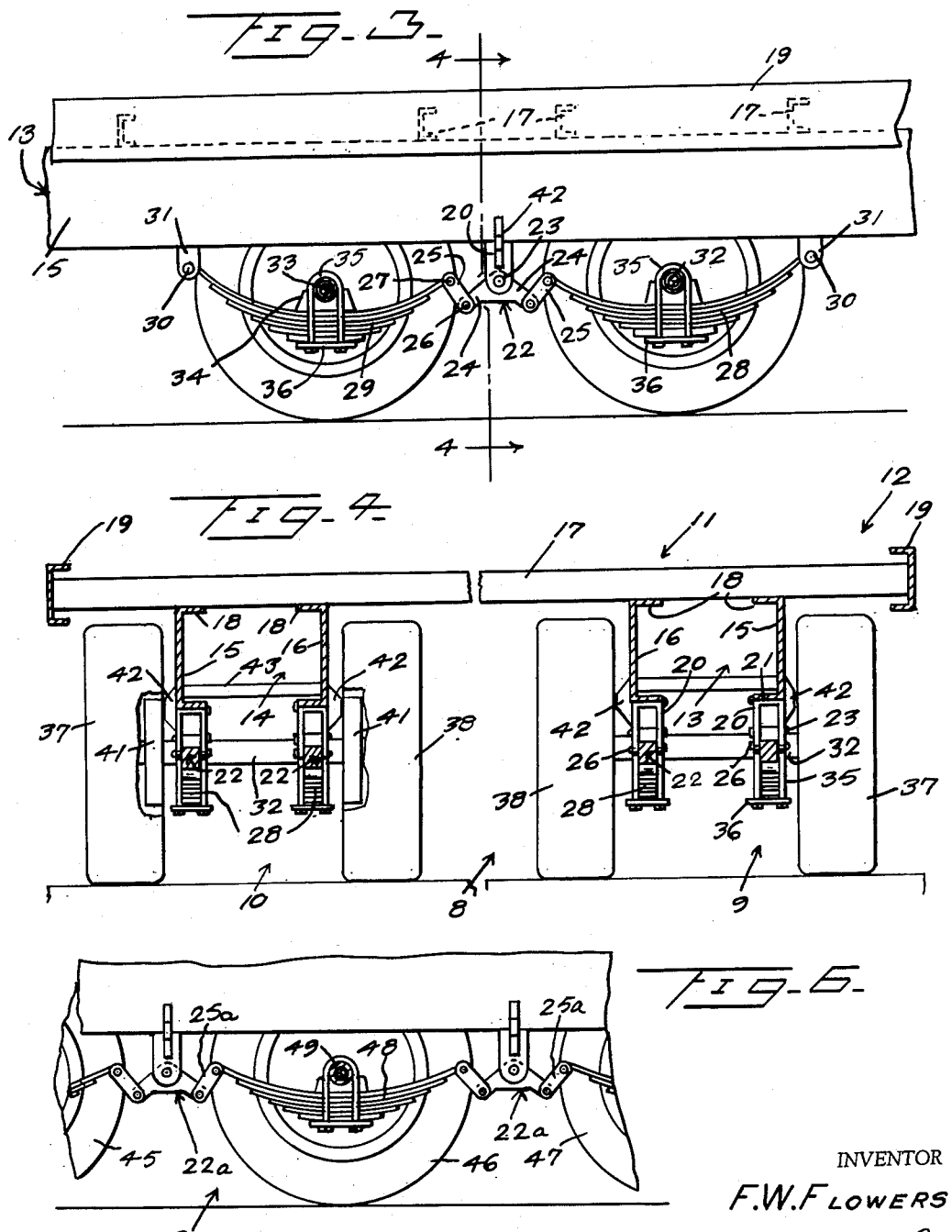

3,166,341
Patented Jan. 19, 1965

3,166,341
TANDEM RUNNING GEAR ASSEMBLY
Francis W. Flowers, 4th and Lake Drive,
Brooklawn, N.J.
Filed Apr. 3, 1963, Ser. No. 270,419
3 Claims. (Cl. 280—104.5)

This invention relates to a running gear assembly for trailer-type vehicles and more particularly to a running gear composed of corresponding transversely spaced bogies, each including tandem axles each supported by a pair of leaf springs which are transversely spaced from one another and which are straddled by two ground engaging wheels which are mounted on the ends of said axle.

A primary object of the present invention is to provide a running gear assembly wherein the individual axles are capable of yielding upwardly and downwardly relative to one another and of rocking in vertical planes disposed crosswise of the vehicle, whereby the running gear will conform automatically to the contour of the roadway or other surface being traversed and so that each wheel will bear approximately an equal share of the load.

Another object of the invention is to provide a running gear wherein the axles are secured midway of the ends of the springs and wherein front and rear springs are disposed in alignment with one another and interconnected at their adjacent ends by equalizer elements, so that a compensating effect is realized between said interconnected springs.

Particularly advantages of the present invention over conventional running gear assemblies for trailer-type vehicles include the avoidance of overloading tires which increases tire wear and causes blowouts; providing an assembly wherein every wheel is equipped with a brake, and the provision of an assembly wherein the load will be caused to ride much smoother thus requiring less power to pull the load and a resulting fuel economy.

Another and important advantage of the present invention resides in the fact that the frame of the trailer, supported by the running gear, may be of maximum width and will have greater spacing between the frame sills to thereby greatly increase chassis stability to minimize the danger of overturning as is quite common in conventional trailer constructions which are frequently rendered top-heavy when loaded.

Various other objects and advantages of the invention will hereinafter become more fully apparent from the following description of the drawings, illustrating presently preferred embodiments thereof, and wherein:

FIGURE 1 is a fragmentary top plan view of a portion of a trailer chassis including the running gear assembly;

FIGURE 2 is a fragmentary bottom plan view thereof;

FIGURE 3 is an enlarged fragmentary side elevational view, partly in section, with certain of the parts removed;

FIGURE 4 is a fragmentary cross sectional view taken substantially along the line 4—4 of FIGURE 3 and with certain of the parts broken away to illustrate details;

FIGURE 5 is an enlarged fragmentary vertical sectional view of a part of the running gear assembly, and FIGURE 6 is a fragmentary view similar to FIGURE 3 illustrating a variation of the wheel assembly.

Referring more specifically to the drawings, and first with reference to FIGURES 1 to 5, the running gear assembly in its entirety is designated generally 8 and includes two identical bogies 9 and 10 which are illustrated in conjunction with a portion of a trailer-type vehicle frame 11, with which the running gear assembly 8 combines to form a trailer chassis 12.

The frame 11 includes two longitudinally extending sill members 13 and 14 each of which is composed of transversely spaced sections 15 and 16, each of which is preferably of channel shape cross section and with the sections of each sill member opening toward one another. Cross members 17, of channel shape cross section, extend across and are secured permanently in any conventional manner to the top flanges 18 of the sill sections 15 and 16. The cross members 17 are disposed in spaced apart relation to one another, longitudinally of the chassis 12. The chassis 12 also includes side rails 19 of inwardly opening channel shape cross section in which the ends of the cross members 17 are secured in a conventional manner. The cross members 17 may support a platform or deck and other superstructure, not shown.

As seen in FIGURE 4, the bogie 9 is connected to the sill member 13 and the bogie 10 is connected to the sill member 14. Since the bogies are of the same construction and are connected in the same manner to the sill members, a description of one will suffice for both. Referring to the bogie 9 and sill member 13 to which it is connected, each sill section 15 and 16 thereof has a depending arch shaped bracket 20 which is permanently secured in a conventional manner to its bottom flange 21. Each bracket 20 supports an equalizer bar 22 by means of a pivot fastening 23 which extends through an intermediate apex portion thereof, so that the equalizer element 22 is mounted for rocking movement in a vertical plane and about an axis disposed crosswise of the chassis 12. The equalizer element 22 has downwardly inclined corresponding ends 24. A pair of links 25 have complementary ends straddling each end 24 and which are pivotally connected thereto by a pivot element 26. The other ends of each pair of links 25 straddle an end of a half elliptical spring and are pivotally connected thereto by a pivot element 27 which extends through the spring eye. Thus, the equalizer element 22 is interposed between two conventional-type half elliptical springs 28 and 29 the spring eyes at the adjacent ends of which are connected to the links 25. The spring eyes at the remote ends of the springs 28 and 29 are connected by pivot fastenings 30 to conventional shackles 31 which are secured to and depend from the bottom flange 21.

It will thus be seen that the bogie 9 includes two transversely aligned front springs 28 and two transversely aligned rear springs 29 including one front and rear spring disposed beneath the sill section 15 and a front and rear spring disposed beneath the sill section 16, as seen in FIGURES 2 and 4. The springs 28 and 29 are downwardly bowed and the links 25 extend upwardly and outwardly from the ends of the equalizer element 22, as seen in FIGURE 3.

A front axle 32 extends across the front springs 28 and a rear axle 33 extends across the rear springs 29. The axles are disposed above the intermediate portions of the springs and engage on blocks 34 which rest upon said springs. Each axle is secured to the two springs with which it is associated by two U-bolt and nut fastenings 35 and a plate 36, in a conventional manner, as illustrated in FIGURE 3.

Rubber tired wheels 37 and 38 are mounted on the ends of the front axle 32 and rubber tired wheels 39 and 40 are mounted on the ends of the rear axle 33, said wheels being mounted in a conventional manner and each having associated therewith a conventional brake 41. The outer front wheel 37 and the inner front wheel 38 straddle the front springs 28 and the sill member 13, as seen in FIGURE 4, and the outer rear wheel 39 and inner rear wheel 40 similarly straddle the rear springs 29 and the sill member 13. A gusset 42 may be provided for bracing each bracket 20 relative to the sill section from which it depends, as seen in FIGURES 1 to 4, and short cross braces 43 are preferably provided between the sill sections adjacent the brackets 20 and shackles 31. As seen in FIGURE 1, the front axles 32 and the rear axles 33, respectively, of the two bogies 9 and 10, are disposed in transverse alignment with one another and the inner wheels 38 and 40 of the two bogies are spaced apart a substantial distance while the outer wheels 37 and 39 of the two bogies are disposed adjacent to but spaced slightly inward from the side rails 19.

When the trailer is traversing a crowned roadway with the crown thereof disposed between or adjacent the inner wheels 38 and 40 of the bogies 9 and 10, the springs 28 and 29 of both bogies will yield to allow the axles 32 and 33 to rock so that all of said axles will be inclined upwardly from their outer to their inner ends and with the inner wheels 38 and 40 thus disposed above the level of the outer wheels 37 and 39, so that the wheels of the two bogies will conform to the contour of the roadway and will all bear a substantially equal share of the load.

In traversing a rough road or other surface, if one of the front wheels 37, for example, passes over a hump, said wheel will be displaced upwardly and the front axle 32 thereof will rock transversely so that its outer end will be elevated relative to its inner end to maintain the front wheel 38 of said axle in ground engaging contact. In addition, the spring 28 located adjacent the wheel 37 will be sprung upwardly causing the link 25 connected to said spring 28 to rock upwardly and inwardly, as seen in FIGURE 3, in a counterclockwise direction and to exert an upward pull on the equalizer element 22 for causing said element to rock counterclockwise and exert a downward pull on the rear spring 29 which is coupled to said equalizer element 22. This will cause the rear axle 33 to rock slightly in the opposite direction to the front axle 32 to momentarily increase the load on the wheel 39. Thus, the equalizing means 22, 25 will distribute the increased pressure exerted on the front spring 28 by the wheel 37 rising and passing over the hump partially to the rear spring 29 and which is coupled to said front spring, so that the interconnected front and rear springs will have a compensating action with respect to one another. It will be apparent that any wheel of either bogie may move upwardly or downwardly relative to the frame 11 and in so moving will cause the axle to which it is connected to rock so that the other wheel of said axle will move in the opposite direction as the springs to which said axle is connected are flexed. The flexing of the two springs will be transmitted through the equalizer means 22 and 25 to the other two springs of the bogie which will be flexed thereby for rocking the other bogie axle slightly in the opposite direction to effect a self-compensating movement between the two bogie axles and springs thereof.

Since the spacing between the outer wheels 37 and 39 of the two bogies 9 and 10 is somewhat less than the width of the trailer as measured between the side rails 19, it will be obvious that the trailer chassis 12 can be of a maximum width, eight feet as legally allowed, and the running gear assembly 8 will afford maximum stability to the frame 11 due to the fact that the width of the running gear as measured between the wheels 37 and 39 of the two bogies is only slightly less than the frame width. Due to this increased stability resulting from the transverse spacing of the two bogies 9 and 10 and the substantial spacing between the two longitudinal sill members 13 and 14, the chassis 12 is particularly well suited for use as a part of a dump trailer, since the pivoted platform thereof, not shown, can be hinged to the rear ends of the two outer sill sections 15 to afford maximum spacing between the two hinged points and thereby maximum stability.

FIGURES 1 to 5 disclose the running gear as including a front pair of wheels and a rear pair of wheels as a part of each bogie; however, as illustrated in FIGURE 6, for larger trailer constructions three or more pair of wheels and a corresponding number of axles may be provided. FIGURE 6 shows a part of a bogie 9a having three pairs of wheels 45, 46 and 47. The bogie 9a differs from the bogie 9 in that it includes two pairs of equalizer elements 22a. The two springs 48 which are connected to the intermediate axle 49 of the intermediate pair of wheels 46, are connected at both ends to equalizer elements 22a by links 25a. The bogie 9a is otherwise identical with the bogie 9 or 10.

Various other modifications and changes are contemplated and may be resorted to, without departing from the function or scope of the invention as hereinafter defined by the appended claims.

I claim as my invention:

1. A trailer vehicle chassis including transversely spaced frame sides, cross members extending between and secured to said frame sides, sill members secured to and disposed beneath said cross members and disposed substantially parallel to the frame sides; a running gear composed of two corresponding bogies connected to said sill members and disposed in transversely spaced relation to one another, each bogie including a front axle and a rear axle, a pair of half elliptic springs connected to each axle, each axle being connected to intermediate portions of the springs thereof, shackles secured to and depending from the sill member and to which the remote ends of the springs of the front and rear axles are connected, adjacent ends of the springs of the front and rear axles being disposed in spaced apart aligned relation to one another, two equalizing means connected to and depending from the sill member, each equalizing means interconnecting adjacent ends of aligned springs, and ground engaging wheels journaled on the ends of each axle including a single outer wheel and a single inner wheel, said outer and inner wheels straddling the sill member and the springs of the axles thereof, said axles being connected to the chassis solely by the springs, shackles and equalizing means.

2. A trailer chassis as in claim 1, each equalizer means including a bracket secured to and depending from the sill member, an equalizer element pivotally connected intermediate of its ends to the bracket for rocking movement about an axis disposed parallel to the axles, and link means pivotally connected to the ends of the equalizer element and to said adjacent aligned spring ends.

3. A running gear assembly comprising transversely spaced bogies, each bogie including axles arranged in tandem relation to one another, single ground engaging wheels journaled on the ends of each axle, a pair of transversely spaced springs interposed between each pair of wheels, means securing intermediate portions of the springs of each pair to the axle individual thereto, and means adapted to be secured to and depending from a sill member and to which the ends of the springs are connected, said means including two equalizer units each interposed between and connecting adjacent ends of adjacent springs of the different axles and shackles to which the remote ends of the springs are connected, said last mentioned means and the springs constituting the sole connection of the axles to the sill member.

References Cited by the Examiner
UNITED STATES PATENTS

| | | | |
|---|---|---|---|
| 2,284,665 | 6/42 | Larison | 280—104.5 |
| 2,446,877 | 8/48 | Jones | 280—104.5 |
| 2,811,213 | 10/57 | Miller | 280—104.5 XR |
| 2,823,926 | 2/58 | Stover | 280—104.5 |

A. HARRY LEVY, *Primary Examiner.*